United States Patent
Howell et al.

(10) Patent No.: US 6,736,249 B2
(45) Date of Patent: May 18, 2004

(54) COMPLIANT CLUTCH

(75) Inventors: Larry L. Howell, Orem, UT (US); Nathan B. Crane, Rocky Hill, CT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 10/203,491

(22) PCT Filed: Feb. 28, 2001

(86) PCT No.: PCT/US01/06308

§ 371 (c)(1), (2), (4) Date: Aug. 9, 2002

(87) PCT Pub. No.: WO01/65134

PCT Pub. Date: Sep. 7, 2001

(65) Prior Publication Data

US 2003/0010594 A1 Jan. 16, 2003

Related U.S. Application Data

(60) Provisional application No. PCT/US01/06308, filed on Feb. 28, 2001.

(51) Int. Cl.$^7$ ............................ F16D 13/14; F16D 43/18
(52) U.S. Cl. ................. 192/103 B; 192/76; 192/104 B; 192/105 BA
(58) Field of Search ...................... 192/103 B, 105 CD, 192/76, 107 M, 75, 104 B, 105 BA

(56) References Cited

U.S. PATENT DOCUMENTS

| | | | |
|---|---|---|---|
| 1,983,661 A | * 12/1934 | Frantz et al. | 192/105 CS |
| 3,712,438 A | 1/1973 | Roddy et al. | 192/105 |
| 3,945,478 A | 3/1976 | Kellerman et al. | 192/105 |
| 4,016,964 A | 4/1977 | Dietzsch et al. | 192/105 |
| 4,645,050 A | * 2/1987 | Ingenhoven | 192/36 |
| 4,821,859 A | 4/1989 | Suchdev et al. | 192/105 |
| 4,850,466 A | * 7/1989 | Rogakos et al. | 192/78 |
| 4,960,194 A | * 10/1990 | Sageshima et al. | 192/103 B |
| 6,148,979 A | 11/2000 | Roach et al. | 192/45.1 |

* cited by examiner

*Primary Examiner*—Saul Rodriquez
(74) *Attorney, Agent, or Firm*—Madson & Metcalf

(57) ABSTRACT

The present invention relates to clutches for selectively transmitting torque, and more particularly, to compliant centrifugal clutches. A compliant clutch (10) may have a plurality of engagement members (42 and 44), preferably at least three, and more preferably at least six. Each engagement member has an outer edge that is movable toward an interior surface of a receiving member (28), such as a drum. Flexible segments (70 and 72) may connect the engagement members to each other. In embodiment, the engagement members are arrayed around a hub, but detached from the hub to form an expandable engagement portion. Both aggressive and non-aggressive engagement members are provided. In another embodiment, the engagement members are affixed by flexible segments to the hub to form an extensible engagement portion. In yet another embodiment, a first and a second arm, each of which contains multiple engagement members connected by flexible segments, extend from the hub to provide non-aggressive torque transfer to the drum.

59 Claims, 8 Drawing Sheets

COMPLIANT CLUTCH

This application is a 371 of PCT/US01/06308 filed Feb. 28, 2001 which claims benefit of Provisional Application Serial No. 60/185,258 filed Feb. 28, 2000.

FIELD OF THE INVENTION

The invention relates to systems and methods for selectively transmitting torque between rotatable members. More particularly, the present invention relates to a compliant clutch having a plurality of engagement members connected to a hub by flexible segments that permit extension of the engagement members to contact a rotatable receiving member, such as a drum.

TECHNICAL BACKGROUND

In many mechanical devices, there exists a need to transmit torque in a variable fashion between two rotating members. Under certain circumstances, such as when a motor is idling or starting to operate, it may be desirable to have the motor disconnected from any load. However, the motor should be connected to the load during normal operation. For example, the engine of a car may be disconnected from the remainder of the vehicle's drive train while idling at a stoplight, and may be reconnected to induce motion of the vehicle.

Several mechanisms exist for disconnecting and reconnecting a rotational load. For example, geared transmissions may disconnect a driving gear from a driven gear, thereby disconnecting a load from a motor. However, geared transmissions are somewhat complex, and typically require that the driving and driven gears be rotated at about the same rate of rotation before they can be reconnected. Additionally, a geared transmission is either fully connected or fully unconnected; there is no in-between state in which torque is transmitted, but relative slippage of the rotational members is still permitted.

Clutches have been developed to provide a more continuous torque transfer. Clutches utilize friction to gradually couple rotational members; since the coupling is not sudden, the rotational members need not be rotating at the same speed, or even in the same direction, for coupling to take place. The friction may operate to ultimately bring the rotational members to the same rotational speed, depending on how the clutch is designed.

Many different types of clutches exist. Some examples are rim types with internal or external expanding shoes, band types, disk or axial types, and cone types. Clutches may be engaged or disengaged manually by a user; for example, a manual transmission in a vehicle uses a clutch that can be selectively disengaged, typically by pressing a pedal. In the alternative, clutches may be engaged or disengaged automatically by some operating characteristic of the machine in which they are used. Centrifugal clutches, for example, may engage or disengage when a threshold rate of rotation of the clutch is achieved. Often, centrifugal clutches take the form of rim type clutches with internal expanding shoes that are spring loaded, so that the shoes contact the rim to transfer torque only when the centrifugal force is large enough to overcome the spring force on the shoes.

Known centrifugal clutches have a number of inherent disadvantages. First, they typically have many parts that must be separately produced and assembled. Each shoe must typically have at least one spring/pin joint combination, and several shoes will often be used; the total number of mechanical parts involved in the production of the centrifugal clutch can easily exceed twenty. Furthermore, known clutches are often quite thick; each pin joint must have a certain minimum length in order to operate. The thickness of the clutch, in combination with the multiplicity of parts required, makes the clutch somewhat heavy. The weight of the clutch contributes significantly to the mass moment of inertia of the entire rotational system, thereby decreasing the efficiency of the machine.

Furthermore, the torque capacity of the clutch depends on a number of factors, including the surface roughness values of the clutch and rim and the outward force with which the clutch presses against the rim. Although the shoes are typically contoured to match the rim, only parts of the shoe will contact the rim until the shoe wears somewhat; the shoes are worn to a smoother finish during use. Thus, the torque capacity will typically change somewhat during use and wear of the clutch. Even when a shoe is fully worn in, the pressure on the shoe is often concentrated at a comparatively small portion of the surface of the shoe. Increasing the number of shoes increases the number of parts, and is therefore a less desirable option for most mechanical clutches.

The manner in which the shoe moves to contact the rim also affects the torque capacity of the clutch. If a shoe moves such that the frictional force of the rim against the shoe tends to increase the pressure of the shoe against the rim, the shoe is termed an "aggressive" shoe. Conversely, if the frictional force tends to actuate the shoe away from the rim, the shoe is a "non-aggressive" shoe. Torque tends to tighten the engagement of aggressive shoes, thereby enhancing their torque capacity. However, aggressive shoes will generally have a far more sudden engagement than nonaggressive shoes; as a result, the aggressive centrifugal clutch does not gradually transfer torque to the load, but rather engages somewhat abruptly. Such abrupt engagement produces higher stresses and may damage mechanical components.

Furthermore, aggressive clutches that are designed or used improperly may induce a condition called "self-locking." Self-locking occurs when the frictional force is sufficient, alone, to overcome the spring force and hold the aggressive shoes against the rim. When self-locking has occurred in a centrifugal clutch, the clutch may remain engaged, even when the clutch has slowed its rotation below the threshold rate of rotation. As long as the torque transferred by the clutch remains high enough to support self-locking, rotation of the clutch is no longer required for engagement.

A motor coupled to the clutch may thus be fully-loaded at a speed far lower than the minimum load-bearing speed of the motor. As a result, the motor or other mechanical components may suffer damage. Thus, the aggressiveness, and hence the torque capacity, of known clutches has also been limited by the need to design the clutch such that self-locking does not occur.

Although known compliant clutches have provided some improvements over known mechanical clutches. Compliant clutches utilize bending material in place of pin joints and springs to provide motion and restorative force. Thus, the part count, production expense, and weight can be decreased somewhat. Such compliant clutches have found application in the lawn and garden industry, in which many smaller machines such as string trimmers, hedge trimmers, edgers, and the like have a need for variable torque transmittal.

However, known compliant clutches typically have a low torque capacity, partly owing to the fact that the compliant clutches utilize a comparatively simple S-configuration with only two members that can bend outward to contact the rim. Thus, the degree of friction that can be generated by known compliant clutches is quite limited. Additionally, torque is often transmitted through the thinner, compliant members of the clutch, so that the strength of the material used to form the compliant members limits the torque the clutch can effectively handle. In many applications, multiple compliant clutches must be used to generate the necessary torque.

Consequently, there is a need in the art for a clutch that is easily manufactured from a small number of parts, and with a minimum of assembly. Furthermore, there is a need in the art for a clutch that can fit within a compact space, and yet provide a high torque capacity. Such a clutch should preferably provide a torque capacity that is high even before significant wear of the clutch has occurred, and that changes comparatively little when wear occurs. There is a further need for a centrifugal clutch in which torsional stress is not concentrated in thin, compliant members of the clutch. The high torque capacity should preferably be provided while maintaining a comparatively smooth engagement, and avoiding any danger of self-locking.

BRIEF SUMMARY OF THE INVENTION

The present invention is directed to compliant clutches with enhanced load-bearing, wear, and manufacturability. The clutches of the present invention may be designed to operate as part of a torque transfer system, in which the clutch resides within a receiving member, which may be configured as a drum with a cylindrical interior surface. The clutch may be attached to a first rotational member, and the drum may then be attached to a second rotational member.

Although the clutch or drum may be connected to other rotating components by gears, belts, magnetic couplings, or the like, the rotational members may simply take the form of a first shaft and a second shaft. The first shaft may be connected to a torque source, such as a rotary motor, and the second shaft may then be connected to a load, such as a generator, flywheels, vehicle wheels, helicopter blades, or the like.

In selected embodiments, the clutch may have a plurality of engagement members connected by flexible segments integrally formed with the engagement members. Each engagement member may have an outer edge shaped to engage the interior surface. The engagement members are preferably situated around a hub that can be affixed to the first shaft. The hub, flexible segments, and engagement members may then be configured in a wide variety of ways.

According to one presently preferred embodiment, the engagement members and flexible segments are detached from the hub. The engagement members are arrayed in ring-like fashion around the hub, with each engagement member connected to its two contiguous neighbors by flexible segments. The engagement members and flexible segments may then be referred to as an expandable engagement portion of the clutch. The flexible segments are alternatingly disposed near the hub, and near the outer edges. As a result, when the flexible segments are rotated so that the inner flexible segments are moved outward, the entire expandable engagement portion may expand so that the outer edges contact the interior surface of the drum.

Due to the arrangement of the flexible segments, expansion of the expandable engagement portion causes each engagement member to pivot in a direction opposite that of its nearest neighbors. However, the frictional force that acts against the engagement members when the outer edges contact the interior surface acts to rotate all of the engagement members in the same direction. Thus, the frictional force tends to push half of the engagement members out of engagement with the interior surface, half of the engagement members into tighter engagement with the interior surface.

As a result, half of the engagement members are aggressive, while half are non-aggressive. All of the engagement members are coupled together so that they cannot independently move toward or away from the interior surface. Thus, a comparatively high torque capacity is provided by the aggressive engagement members, while the non-aggressive engagement members ensure that engagement is relatively smooth. Self-locking is unlikely because the non-aggressive engagement members counteract the frictional forces that would tend to cause self-locking of the aggressive engagement members.

Preferably, the hub has a plurality of arms extending outward into interior slots of the expandable engagement portion. Thus, torque may be transferred directly from the hub into the engagement members, and from the engagement members to the drum. Although some torque may be transferred through the flexible segments, torsional stresses in the clutch are not all concentrated in the comparatively thin, compliant segments, but are rather transmitted through other pathways. Thus, the torque capacity is not materially limited by the strength of the flexible segments.

For purposes of analysis, each aggressive engagement member may be paired with a non-aggressive engagement member to form an engagement pair. The hub may have arms separating each engagement pair; the arms may act to transfer torque between the hub and the expandable engagement portion. The arms may thus fit within interior slots formed in the expandable engagement portion, between each engagement pair.

Since all of the engagement pairs are symmetrically arrayed about the hub, analysis of a single engagement pair can be carried out and applied to the entire expandable engagement portion. Such analysis may be relatively easily performed through the aid of a pseudo-rigid body model (PRBM). Large deflection of members is difficult to determine analytically. However, in the PRBM, the flexible segments are approximated as pin joints with attached torsional springs. Shorter flexible segments have the pin joint positioned in the middle of the flexible segment, while longer flexible segments may have a pin joint positioned at a predetermined distance from a stationary end of the flexible segment.

Through the use of such approximations, the operation of each engagement pair may be analyzed using traditional kinematic analysis techniques. Thus, the clutch may be modified to obtain desired operational characteristics. For example, it may be desirable to obtain a clutch with a certain threshold rotational rate, or a series of varying torque capacities over a range of rotational rates. The clutch may need to have a certain diameter, thickness, weight, or wear resistance. Analysis of the PRBM is helpful in determining how thick and long the flexible segments should be, what the mass of the engagement members should be, where the centers of gravity of the engagement members should be located, what materials the clutch should be made of, and other critical parameters. These parameters can then be used to obtain an optimally-designed compliant centrifugal clutch.

Such a clutch may also be relatively easily manufactured. According to a preferred embodiment, the engagement members, the flexible segments, and the hub all lie and move within the same plane. Thus, the clutch can be manufactured by processing a workpiece of the proper material with a simple, planar, manufacturing operation. The centrifugal clutch may, for example, be milled, stamped, molded, extruded, or the like. The hub may be made from a cutout of the expandable engagement portion. Preferably, the clutch is made symmetrical, so that the clutch can be used in the same way in either rotational direction.

According to one alternative embodiment, the engagement members, flexible segments, and the hub may all be formed unitarily. The centrifugal clutch may once again have engagement members connected such that half of the engagement members move in an aggressive manner, and half move in a non-aggressive manner. Rather than being connected directly to each other by flexible segments, each engagement pair may connected to the hub by the flexible segments. Furthermore, each engagement pair may be connected to the hub by two separate flexible segments positioned at either end of the engagement pair. Thus, each engagement pair is redundantly connected to the hub to form a closed loop. The engagement pairs, with their associated flexible segments, may collectively be referred to as an extensible engagement portion.

The hub may have arms extending outward, from which the flexible segments extend to reach the engagement members. Between the arms, each engagement pair may have a flexible segment connecting the aggressive engagement member to the non-aggressive engagement member, in a position close to the hub. Thus, the motion of the engagement members may be similar to that of the engagement members of the first embodiment.

The clutch may operate in somewhat similar fashion to that of the first embodiment. The aggressive and non-aggressive engagement members may be induced by friction to rotate in opposite directions about their own centers of gravity. Thus, a comparatively high torque capacity may still be obtained without sacrificing engagement smoothness. Advantageously, the clutch with an integral hub requires no mechanism to keep the hub and the extensible engagement portion coplanar.

The clutch according to such an embodiment may be analyzed in much the same fashion as described in connection with the first embodiment. A pseudo-rigid body model may be created based on the shape of the clutch, and kinematic analysis may be carried out according to traditional methods to determine the necessary parameters for the clutch. The clutch may also be manufactured using a single planar operation, as described in connection with the previous embodiment.

According to yet another alternative embodiment, a centrifugal clutch according to the invention may have only non-aggressive engagement members, and may be designed to rotate in a single direction. For example, multiple engagement members may be connected together by one or more flexible segment to form a first arm, which may then be connected to the hub by another flexible segment. The hub may have an arm extending away from the hub, and the first arm may be attached to the arm of the hub in trailing fashion (such that the arm of the hub leads the first arm in its rotation). Preferably, the centrifugal clutch also has a second arm symmetrical with the first arm, so that the clutch is rotationally balanced on the first rotatable member. According to selected embodiments, each of the first and second arms has at least two engagement members connected by flexible segments. Preferably, each arm has from two to five engagement members connected by flexible segments.

In operation, the clutch in this embodiment may provide an exceptionally smooth engagement. The engagement members disposed at the end of the first and second arms may be the first to contact the interior surface. As the clutch rotates faster, the other engagement members may come into contact with the interior surface one-by-one, so that the amount of friction between the clutch and the drum increases gradually with the angular velocity of the clutch. The engagement of all of the engagement members is non-aggressive because the frictional force acting on each engagement member tends to rotate the engagement members inward, away from the interior surface. The comparatively large number of engagement members tends to increase the frictional force exerted by the clutch against interior surface, thereby providing an increased torque capacity over known clutch designs having only two rim-engaging surfaces.

Preferably, the first and second arms, including the engagement members and the flexible segments, are integrally formed with the hub. Once again, planar manufacturing methods can be used to create the clutch. Additionally, a pseudo-rigid body model may be utilized to analyze the operation of a design for the clutch, and the adjust design parameters of the clutch accordingly.

Through the novel clutch designs presented herein, the torque capacity of centrifugal clutches may be enhanced without sacrificing starting smoothness or creating a significant risk of self-locking behavior. Clutches may be easily designed to suit a wide variety of applications through the application of pseudo-rigid body modeling techniques. Additionally, the clutches of the present invention fit within a small space, and may be readily manufactured using rapid and inexpensive processes.

DETAILED DESCRIPTION OF THE INVENTION

The present invention is directed to a clutch, and more particularly, to a lightweight, compliant, centrifugal clutch with enhanced torque transmission properties. The clutches of the present invention utilize the bending mechanics of materials, in combination with the principles of static and dynamic friction, to obtain a higher torque capacity while maintaining smooth engagement, light weight, easy manufacturability, and a narrow profile.

Friction is generally related to the surface roughness of the contacting surfaces and proportional to the force pressing the contacting surfaces together. Thus, in order to increase the torque capacity of a centrifugal clutch, one of those values must be increased. The surfaces of the clutch and drum will not maintain roughness over time; consequently, the surface roughness cannot readily be altered. The force pressing the contacting surfaces together is generally proportional to the mass of the members, and thus cannot be increased significantly without increasing the mass of the clutch.

However, the total amount of friction transmitted by the clutch can be increased by providing multiple engagement members, each of which engages the interior surface of the receiving member. Through the use of the flexible segments, the engagement members may be arranged to contact the interior surface at substantially the same time, or in sequence. As a result, a large number of torque/angular velocity curves may be provided to suit the various applications for a centrifugal clutch. If desired, the engagement members may also be arranged to be actuated outward by some external force, besides the centrifugal force. Thus, the clutch of the invention need not be a centrifugal type clutch.

Clutches may be designed through the use of a simulation tool called the pseudo-rigid body model, in which the flexible segments are replaced with spring-loaded pin joints for the purpose of analysis. Clutches with a symmetrical array of engagement members may be analyzed through the modeling of the smallest symmetrical portion of the clutch. The smallest symmetrical portions form linkages that can be analyzed through the application of kinematic principles. The application of these principles will be further explained, with reference to the exemplary embodiments of FIGS. 1 through 8, in the following description.

Figure 1:
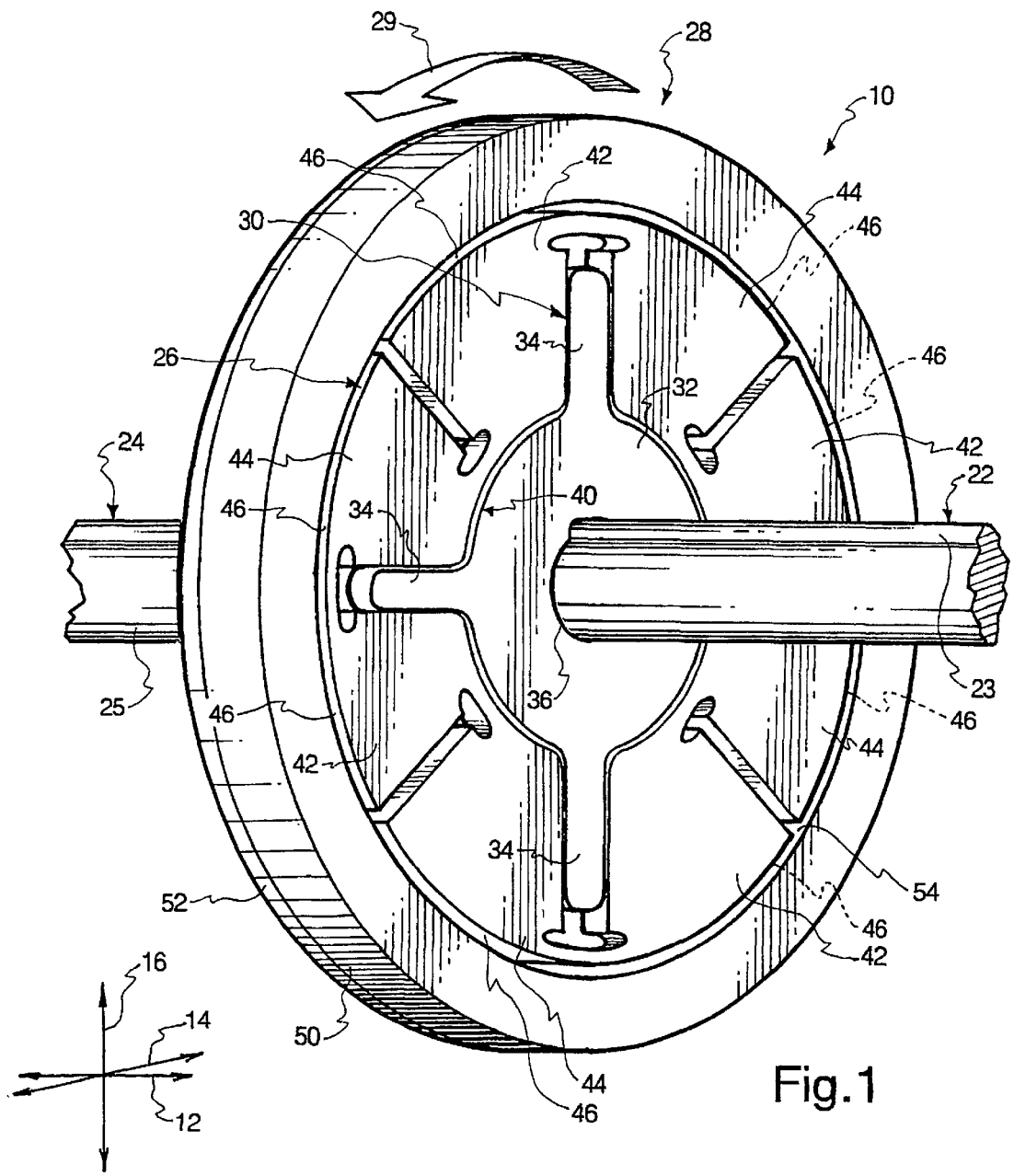
FIG. 1 is a perspective view of one embodiment of a clutch according to the present invention, attached to an input shaft and disposed within a drum attached to an output shaft, in which the clutch is in the disengaged configuration.

Referring to FIG. 1, one possible embodiment of a torque assembly 10 is depicted. The torque assembly 10 may have a longitudinal direction 12, a lateral direction 14, and a transverse direction 16. As shown, the torque assembly 10 includes a first rotatable member 22, which may take the form of a first shaft 22 with a key 23 to permit rotational coupling of the first shaft 22 to other rotatable devices. The first shaft 22 may further be an input shaft rotationally coupled to a motor or other source of rotational inertia.

The torque assembly 10 may be configured to selectively convey torque from the first shaft 22 to a second rotatable member 24, which may take the form of a second shaft 24 with a key 25. The second shaft 24 may act as an output shaft, and may be connected to a load such as a flywheel, vehicle wheels, a generator, or the like. As shown, a clutch 26, according to one preferred embodiment, is attached to the first shaft 22. The clutch 26 may be disposed within a receiving member 28 attached to the second shaft 24. The receiving member 28 receives the torque from the clutch 26 and transmits the torque through the second shaft 24, to the load. The receiving member 28 may take the form of a drum 28 or the like.

As shown in FIG. 1, the clutch 26 is not rotationally coupled to the drum 28. The clutch 26 is rotating in a direction 29 with respect to the drum. The drum 28 need not be stationary, but may be rotating in the direction 29, more slowly than the clutch 26, or may be rotating in the opposite direction.

Preferably, the first shaft 22 is attached to a hub 30 centrally located within the clutch 26. The hub 30 may have a central portion 32 and a plurality of arms 34 extending outward from the central portion 32. A keyhole 36 may be formed in the central portion 32, and is preferably shaped to match the keyed shape of the first shaft 22.

An expandable engagement portion 40 of the clutch 26 is, according to the embodiment depicted in FIG. 1, detached from the hub 30. The expandable engagement portion 40 is configured to expand outward, with respect to the hub 30, to engage the drum 28. The expandable engagement portion 40 is depicted in a contracted configuration in FIG. 1. As shown, the expandable engagement portion 40 comprises a plurality of aggressive engagement members 42 and non-aggressive engagement members 44, each of which has a roughly trapezoidal shape. Each of the engagement members 42, 44 has an outer edge 46 with an arcuate shape. Preferably, the outer edges 46, taken together, form a generally circular shape.

The drum 28 may have a tubular member 50 encircling the clutch 26 and a backing plate 52 with a diameter substantially the same as an outer diameter of the tubular member. The backing plate 52 may have a keyhole (not shown) similar to the keyhole 36 designed to receive and transmit torque to the second shaft 24. The tubular member 50 has an interior surface 54 with a cylindrical shape, facing inward toward the clutch 26. The interior surface 54 preferably has a radius of curvature similar to or slightly larger than the radius of curvature of each of the outer edges 46 of the engagement members 42, 44. The drum 28 may also be configured in a wide variety of other ways, as will be appreciated by those skilled in the art.

Figure 2:
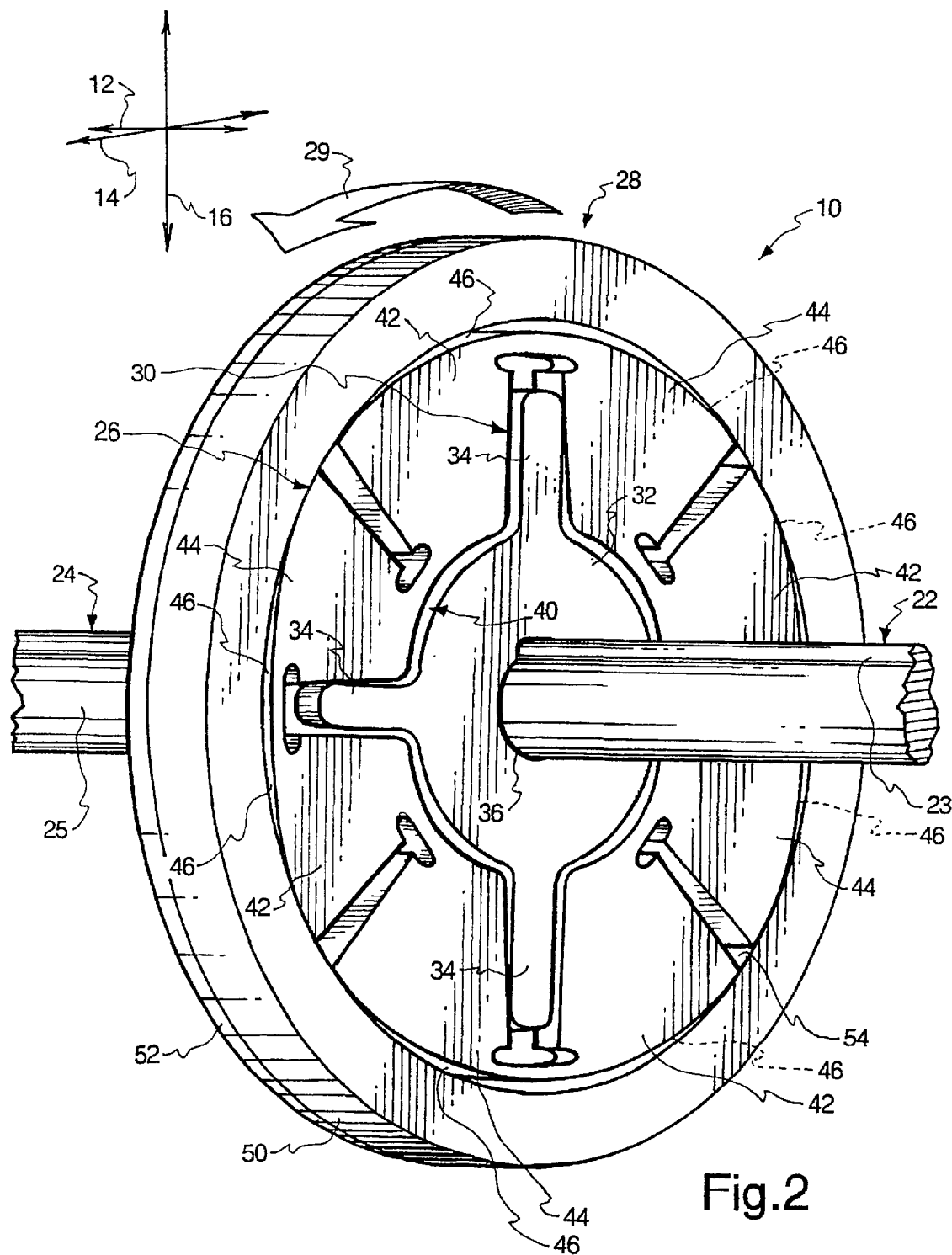
FIG. 2 is a perspective view of the embodiment of FIG. 1, in which the clutch is in the engaged configuration.

Referring to FIG. 2, the torque transfer assembly 10 of FIG. 1 is shown, with the clutch 26 in contact with the interior surface 54. More specifically, the expandable engagement portion 40 has expanded to an expanded configuration such that the outer edges 46 of the engagement members 42, 44 press against the interior surface 54. The engagement members 42, 44 have pivoted somewhat to permit the expansion. There may still be relative rotation in the direction 29 between the clutch 26 and the drum 28; the outer edges 46 may be expected to slide against the interior surface 54 until the drum 28 has reached the same rotational velocity as the clutch 26. The operation of the clutch 26 will be further described in connection with FIG. 3.

Figure 3:
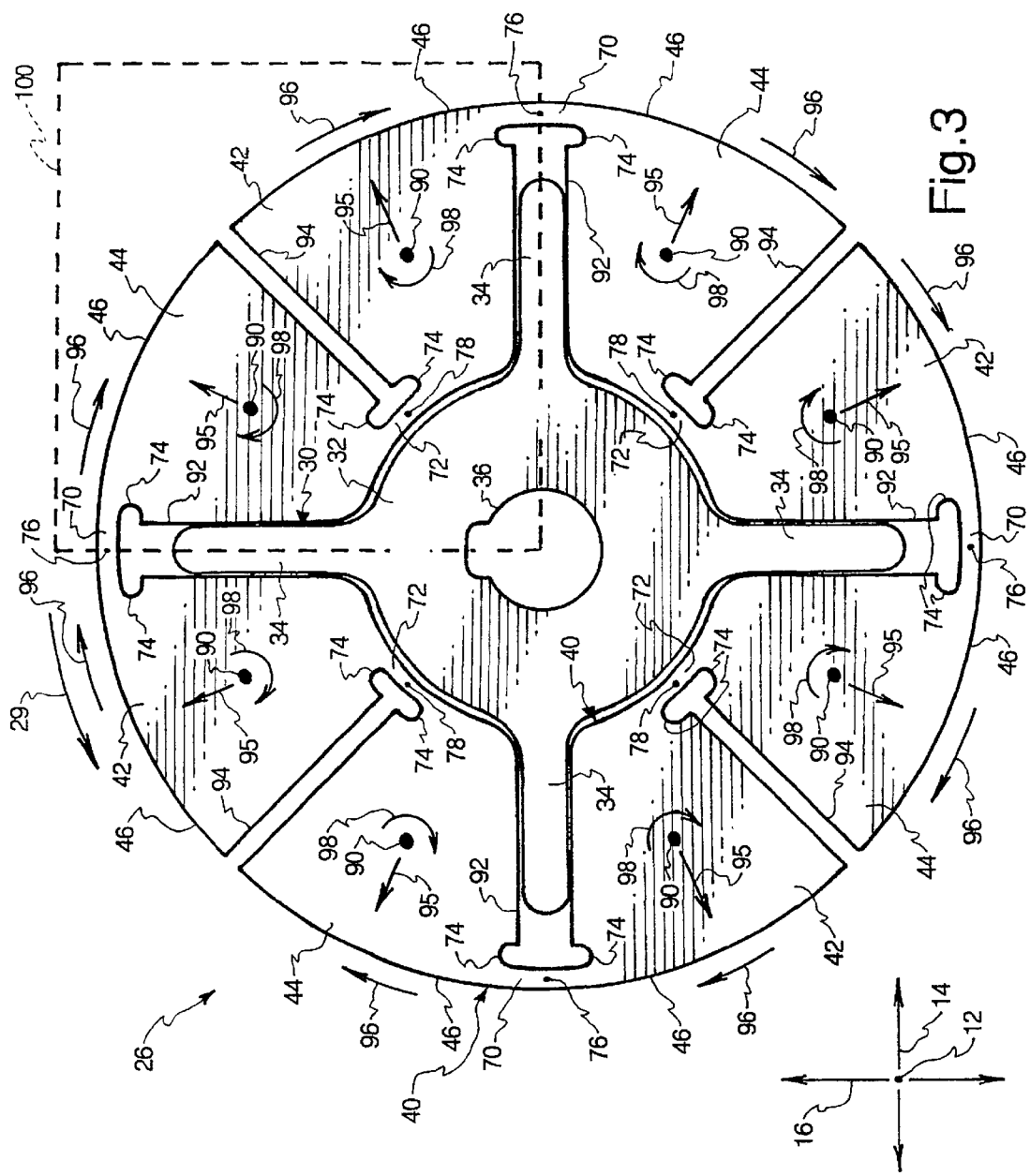
FIG. 3 is a plane view showing only the clutch of FIG. 1.

Referring to FIG. 3, a plane view of the clutch 26 of FIGS. 1 and 2 is shown. The engagement members 42, 44 of the expandable engagement portion 40 may be connected together by a plurality of flexible segments 70, 72. More specifically, outer flexible segments 70 may connect the trailing edge of each of the aggressive engagement members 42 to the leading edge one of the non-aggressive engagement members 44. Similarly, inner flexible segments 72 may connect the trailing edge of each of the non-aggressive engagement members 44 to the leading edge of one of the aggressive engagement members 42.

Preferably, the flexible segments 70, 72 are flexible enough to permit pivotal motion of the engagement members 42, 44 with respect to each other, but stiff enough to draw the expandable engagement portion 40 from the expanded configuration of FIG. 2 to the contracted configuration of FIG. 1. The stiffness of the flexible segments 70, 72, depends generally on the threshold rate of rotation, at which initial engagement of the clutch 26 with the drum 28 is desired.

The stiffness of the flexible segments 70, 72 depends on the material of which they are made, their length, and their thickness (both in the longitudinal direction 12 and along the radius of the clutch 26). Alcoves 74 may be formed in the engagement members 42, 44, adjacent to the flexible segments 70, 72, to effectively lengthen the flexible segments 70, 72 without removing significant weight from the engagement members 42, 44. Increasing the depth of the alcoves 74 effectively lengthens the flexible segments 70, 72, thereby making them more flexible and lowering the resilient force exerted by them against the engagement members 42, 44.

Consequently, the threshold rate of rotation can be lowered by making the alcoves 74 deeper, or raised by making the alcoves 74 shallower, removing them entirely, or even replacing them with extensions that further decrease the length of the flexible segments 70, 72. The threshold rate of rotation can also be changed by altering the thickness of the flexible segments 70, 72.

The outer flexible segments 70 may each have an equivalent pivot 76, centrally positioned in each of the flexible segments 70. Similarly, the inner flexible segments 72 may each have an equivalent pivot 78. The equivalent pivots 76, 78 are not physical features, but rather points established for purposes of analysis to indicate how the engagement members 42, 44 can be expected to move with respect to each other. Each of the equivalent pivots 76, 78 has a torsional spring constant representing the resilient force, or force tending to resist bending, provided by the equivalent pivots 76, 78. For clarity, no torsional spring is shown.

The engagement members 42, 44 may each have a center of gravity 90, which can be determined analytically. The threshold rate of rotation may also be increased by decreasing the weight of the engagement members 42, 44. Increasing the weight of the engagement members 42, 44 can intensify the outward force applied to the engagement members 42, 44 during rotation of the clutch 26, and thereby increase the torque capacity of the clutch 26. The clutch 26 of FIG. 3 has been deliberately designed such that the vast majority of the material within the roughly circular profile of the clutch 26 is within the engagement members 42, 44. As a result, the torque capacity of the clutch 26 is much higher than that of other similarly-sized clutch designs in which a smaller proportion of material is extensible from the hub.

The expandable engagement portion 40 may have a plurality of interior slots 92 formed inward of the outer flexible segments 70. Each of the arms 34 of the hub 30 may be disposed within one of the interior slots 92. Thus, torque in the first shaft 22 is transmitted to the hub 30, through the arms 34, and to the expandable engagement portion 40. More specifically, the arms 34 press against the aggressive engagement members 42, which, in turn, transfer the torque to the drum 28. As a result, the torque being transmitted through the clutch 28 is not concentrated in the flexible segments 70, 72, but is rather transferred through a much larger cross-section of material. The strength of the flexible segments 70, 72 therefore need not limit the torque capacity of the clutch 26.

The expandable engagement portion 40 may also have a plurality of exterior slots 94 formed outward of the inner flexible segments 72; the exterior slots 94 need not accommodate any member and may therefore be quite thin. Upon expansion of the expandable engagement portion 40, the slots 92, 94 can be expected to expand, as depicted in FIG. 2.

When the clutch 26 is rotating in the direction 29 or in the opposite direction, a force 95, which may be termed the centrifugal force 95, acts on the engagement members 42, 44, tending to draw them outward. Thus, the centrifugal force 95 is depicted in FIG. 3 as arrows extending outward from the centers of gravity 90 of the engagement members 42, 44.

When the engagement members 42, 44 pivot outward far enough to make contact with the interior surface 54, the clutch 26 exerts a frictional force against the drum 28 tending to increase the angular velocity of the drum 28 in the direction 29. The drum 28, in turn, exerts a corresponding frictional force against the clutch 26. This frictional force may be divided into a plurality of roughly equal frictional forces 96 acting against the outer surfaces 46 of the engagement members 42, 44. The frictional forces 96 each exert a frictional moment 98, depicted as curved arrows around the centers of gravity 90 of the engagement members 42, 44. When the direction 29 is counterclockwise, as depicted, the frictional moments 98 will each be clockwise.

In order to permit expansion of the expandable engagement portion 40, the engagement members 42, 44 must each rotate about their own centers of gravity 90, apart from the rotation of the clutch 26 as a whole. More specifically, when rotation of the clutch 26 is in the direction 29 shown (counterclockwise), the aggressive engagement members 42 rotate in a clockwise direction, while the non-aggressive engagement members rotate in a counterclockwise direction. The frictional moments 98 are all in a clockwise direction, and therefore tend to pivot the aggressive engagement members 42 into a more expanded configuration, i.e., away from the hub 30. However, the frictional moments 98 tend to pivot the non-aggressive engagement members 44 into a less expanded configuration, i.e., toward the hub 30.

The action of the frictional moments 98 therefore causes the aggressive engagement members 42 to tighten their engagement with the interior surface 54 when the torque transmitted through the torque transfer assembly 10 increases, while the non-aggressive engagement members 44 loosen their engagement with increasing torque. If the clutch 26 were rotating with respect to the drum 28 in direction opposite the direction 29 (in a clockwise direction), the aggressive engagement members 42 shown in FIG. 3 would become non-aggressive, and the non-aggressive engagement members 44 shown in FIG. 3 would become aggressive. The symmetry of the clutch 26 ensures that the clutch 26 will operate in the same fashion, regardless of the direction of rotation of the clutch 26 with respect to the drum 28.

As shown, the clutch 26 includes four radially symmetrical sections. However, those of skill in the art will recognize that the invention could be practiced with two to twelve or more symmetrical sections. Providing more symmetrical sections provides more engagement members 42, 44 to contact the interior surface 54; however, additional symmetrical sections reduce the weight and range of pivotal motion of each of the engagement members 42, 44. Three to six symmetrical sections are presently preferred to obtain a preferred balance between weight and range of pivotal motion.

In order to analyze the operation of the clutch 26, only one symmetrical section need be analyzed. Thus, a symmetrical quarter 100 of the clutch 26 has been isolated for analysis. Operation of the remaining three quarters of the clutch 26 can be expected to mirror that of the symmetrical quarter 100.

Figure 4:
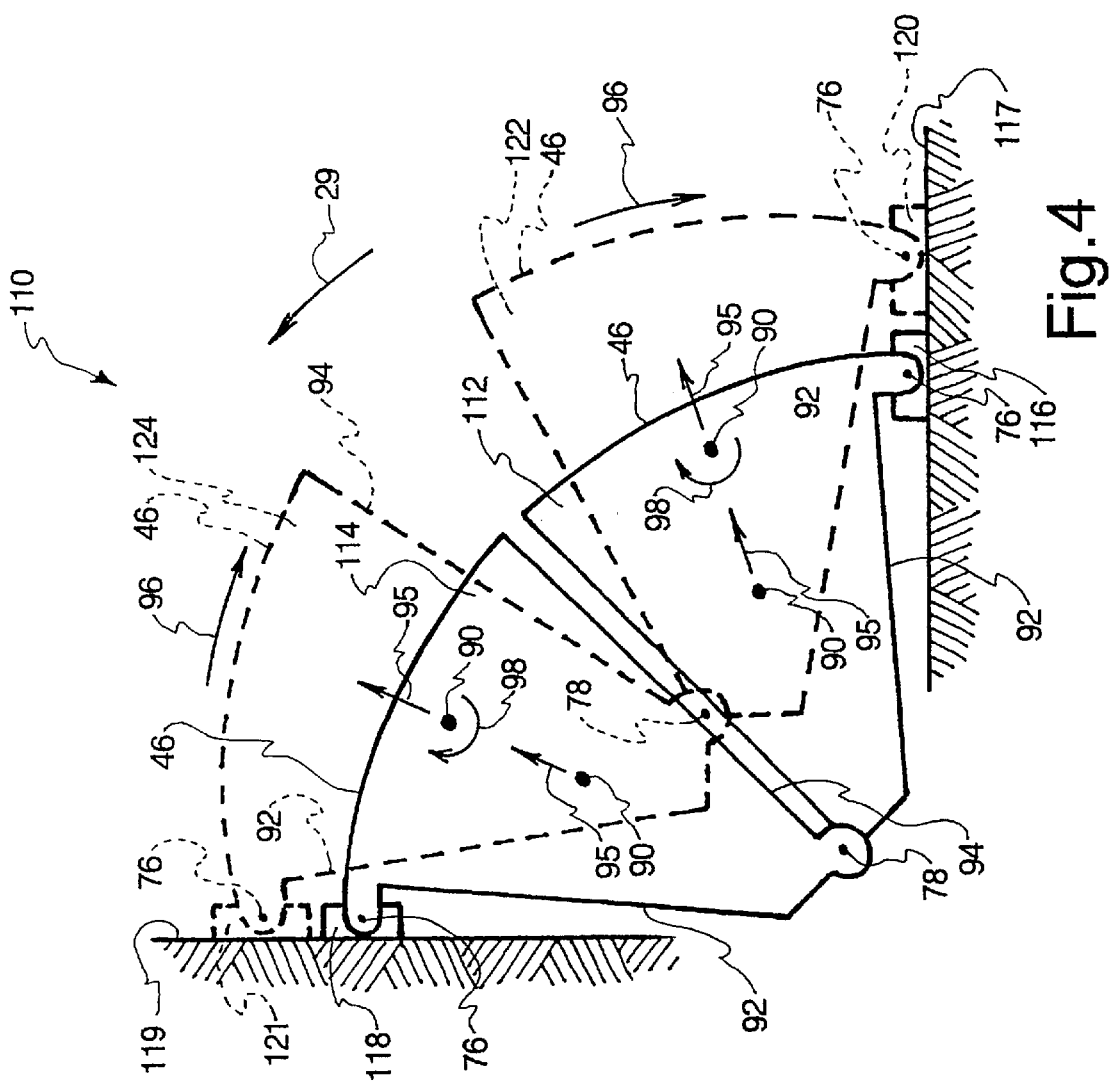
FIG. 4 is a pseudo-rigid body model depicting one symmetrical quarter of the clutch of FIG. 1, in contracted and expanded configurations.

Referring to FIG. 4, a pseudo-rigid body model 110 (PRBM) of the symmetrical quarter 100 of the clutch 26 is depicted. A rigid-body version 112 of the aggressive engagement member 42 and a rigid-body version 114 of the non-aggressive engagement member 44 are shown, connected together by the equivalent pivot 78. Since the outer flexible segments 70 move outward from the hub 30 when the expandable engagement portion 40 expands, the equivalent pivots 76 corresponding to the outer flexible segments 70 are modeled as a lateral slider 116 that slides laterally against a lateral surface 117 and a transverse slider 118 that slides transversely against a transverse surface 119.

The surfaces 117, 119, the sliders 116, 118, and the rigid-body engagement members 112, 114 provide a useful operation of the motion of the motion of the engagement members 42, 44. More specifically, the PRBM 110 appears to show a five-bar linkage, in which the surfaces 117, 119 are one bar, the sliders 116, 118 are two more, and the rigid-body engagement members 112, 114 are the final two bars. The PRBM 110 appears to have two degrees of freedom, as the rigid-body engagement members 112, 114 can still move when either of the sliders 116, 118 is held stationary. However, the interference of the arms 34, as well as the resilient force of the flexible segments 70, 72, effectively constrains the sliders 116, 118 to move across equal displacements.

As a result, when the expansive motion of the rigid-body engagement members 112, 114 is exaggerated somewhat, the rigid-body engagement members 112, 114 take the positions shown in phantom and designated 122, 124. The slots 92, 94 are effectively widened by the expansion. Additionally, the centers of gravity 90 of the rigid-body engagement members 112, 114 have moved outward.

Once in the expanded positions 122, 124, the rigid-body engagement members 112, 114 are subject to the frictional forces 96, which induce the moments 98 about the centers of gravity 90. The moments 98 tend to rotate the aggressive rigid-body engagement member 112 such that the equivalent pivot 78 is drawn outward. However, the moments 98 also tend to rotate the non-aggressive rigid-body engagement member 114 such that the pivot point 78 is pressed inward.

Thus, the rigid-body engagement members 112, 114 are constrained such that their outer edges 46 are continually at substantially the same displacement from the interior surface 54. This shows that the actual engagement members 42, 44 of the symmetrical quarter 100 form an engagement pair, in which the aggressive engagement member 42 is constrained to the same degree of expansion as the non-aggressive engagement member 44. As a result, many of the benefits of aggressive engagement are obtained, including a higher torque capacity. However, some 6f the benefits of non-aggressive engagement, such as a smoother overall engagement and high resistance to self-locking, are also obtained.

By performing a conventional kinematic analysis of the pseudo-rigid body model 110 of FIG. 4, attributes of the flexible segments 70, 72 and engagement members 42, 44 may be obtained. For example, given a desired operational characteristic of the clutch 26, such as a required torque capacity at a given rotational rate, the masses of the centers of gravity 90, the spring constants of the equivalent pivots 76, 78, and the necessary displacements and angles between the equivalent pivots 76, 78 may be obtained. Using those values, the length and thickness of the flexible segments 70, 72, the dimensions of the engagement members 42, 44, the mass of each of the engagement members 42, 44, the material of which the clutch 26 is to be formed, and other parameters of the design of the clutch 26 may be selected. Thus, the clutch 26 may be modified to suit a wide variety of applications through the use of the PRBM 110.

The clutch 26 may also be manufactured relatively easily. Since the engagement members 42, 44 are coplanar with the flexible segments 70, 72 and the hub 30, a single planar manufacturing operation, such as stamping, extruding, milling, molding, or the like may be used to create the clutch 26. The clutch 26 may be made from a wide variety of materials, including polymers, metals, and possibly some ceramics. Preferably, the material used has a comparatively high ratio of yield strength to elastic modulus, to provide high flexibility and resistance to plastic deformation. Certain plastics, aluminum alloys, and low carbon steels may optimally be used to form the clutch 26, depending on the desired application of the clutch 26. Yield strength to elastic modulus ratios for metals that can be used to form the clutch may, in certain embodiments, range from 0.001 to 0.01.

Figure 5:
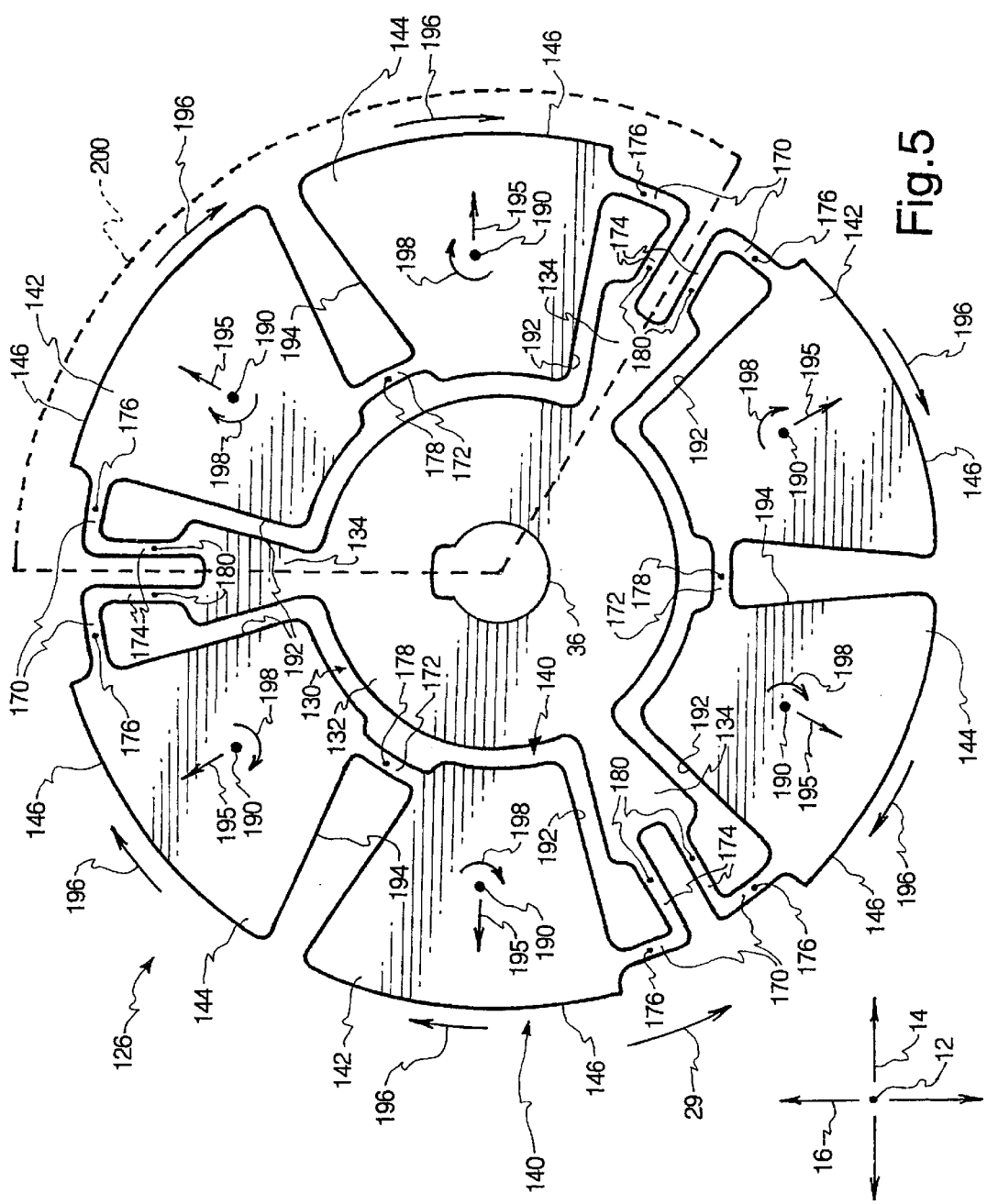
FIG. 5 is a plane view showing an alternative embodiment of a clutch according to the present invention.

Referring to FIG. 5, a plane view of another embodiment of the invention is depicted. The clutch 126 depicted in FIG. 5 may be utilized in much the same fashion as that of FIGS. 1 through 3. Thus, the clutch 126 may form apart of a torque transfer assembly like the torque transfer assembly 10 of FIG. 1, with a first shaft 22 connected to the clutch 126 and a second shaft 24 connected to a drum 28, within which the clutch 126 is disposed.

The clutch 126 is somewhat similar to the clutch 26 in structure and operation. The clutch 126 has a hub 130, in which a central portion 132 and a plurality of arms 134 are formed. However, the arms 134 are connected to and integrally formed with an extensible engagement portion 140 configured to extend outward from the hub 130, in an extended configuration, to contact the interior surface 54 of the drum 28. The extensible engagement portion 140 may have a plurality of aggressive engagement members 142 and a plurality of non-aggressive engagement members 144. Each of the engagement members 142, 144 may have an outer edge 146 that can be moved into direct contact with the interior surface 54.

The extensible engagement portion 140 is different from the expandable engagement portion 40 of FIGS. 1 through 3 mainly in the fact that the extensible engagement portion 140 is attached to the hub 130, while the expandable engagement portion 40 is free-floating. Thus, the extensible engagement portion 140 may have flexible segments 170, 172, 174 configured somewhat differently from the flexible segments 70, 72 of the previous embodiment.

More specifically, the extensible engagement portion may have a plurality of outer flexible segments 170, each of which is connected to one of the engagement members 142, 144. Inner flexible segments 172 may be connected each pair of adjacent engagement members 142, 144 not separated by one of the arms 134 of the hub 130. Thus, the inner flexible segments need only be half as numerous as the engagement members 142, 144. Intermediate flexible segments 174 may serve to attach each of the outer flexible segments 170 to the arms 134. Alcoves (not shown) like the alcoves 74 of FIGS. 1 through 3 may be added if it is deemed desirable to lengthen any of the flexible segments 170, 172, 174.

The flexible segments 170, 172, 174 may each have equivalent pivots 176, 178, 180 similar to those depicted in FIG. 3. More specifically, each of the outer flexible segments 170 may have an equivalent pivot 176, each of the inner flexible segments 172 may have an equivalent pivot 178, and each of the intermediate flexible segments may have an equivalent pivot 180. Since the flexible segments 170, 172 are short in length, the equivalent pivots 176, 178 may be centrally located with respect to each of the flexible segments 170, 172.

However, the intermediate flexible segments 174 may be somewhat longer, and may therefore have equivalent pivots 180 located somewhat nearer the arms 134, to take account of the fact that a loaded member will experience greater bending further from the load. Loads applied to the intermediate flexible segments 174 through the outer flexible segments 170 thus tend to induce a greater deflection near the junctions of the intermediate flexible segments 174 with the arms 134, where the equivalent pivots 180 have been positioned.

Each of the engagement members 142, 144 may have a center of gravity 190. As with the previous embodiment, the mass of the engagement members 142, 144 is a major determinant of the threshold rotational rate and the torque capacity of the clutch 126. The extensible engagement portion 140 may also have a plurality of interior slots 192 formed generally around the arms 134 of the hub 130, and a plurality of exterior slots 194.

As with the previous embodiment, when the clutch 126 rotates in either direction, a centrifugal force 195 acts on the centers of gravity 190 to pull the engagement members 142, 144 outward. When rotation of the clutch 126 is in the direction 29, and the engagement members 142, 144 have extended outward far enough to contact the interior surface 54, a frictional force 196, induced by the contact with the interior surface 54, acts on each of the engagement members 142, 144. The frictional force 196 induces a frictional moment 198 in each of the engagement members 142, 144.

Once again, the aggressive engagement members 142 must rotate to contact the interior surface 54 in the same direction as the frictional moment 198. Conversely, the non-aggressive engagement members 144 must rotate in a direction opposite to that of the frictional moment 198 to contact the interior surface 54. Again, one aggressive engagement member 142 may be paired with one non-aggressive engagement member 144 to form an engagement pair, for purposes of analysis. As shown in FIG. 5, three such engagement pairs exist, one of which has been designated a symmetrical third 200 for purposes of analysis. It will be appreciated that the number of engagement pairs may vary.

The effect of the arrangement of flexible segments 170, 172, 174 and engagement members 142, 144 with respect to the hub 130 is to attach each of the engagement pairs to the hub 130 along two separate routes to form a closed loop. The closed loop permits the clutch 126 to be rotated in either direction to obtain the same functionality. Additionally, the closed loop permits the resilient force of the flexible segments 170, 172, 174 to be combined to obtain some rather unique effects related to the displacement of the engagement members 142, 144.

For example, the flexible segments 170, 172, and 174 may be arranged such that the resilient force against the engagement pair is substantially constant, regardless of how far the engagement members 142, 144 have been moved outward toward the interior surface 54. Alternatively, the flexible segments 170, 172, 174 maybe configured to provide bi-stable operation.

In a bi-stable configuration, the engagement members 142, 144 would have an extended configuration in which the net restorative force tending to pull the engagement members 142, 144 inward again is zero. Thus, for example, the clutch 126 maybe made to engage the interior surface 54 at a threshold rate of rotation, and may shift into another stable, connected state so that the clutch 126 continuously engages the drum 128 regardless of the angular velocity of the clutch 126, until an external inward force is provided against the engagement members 142, 144 to return them to a retracted, stable configuration.

As with the first embodiment, the embodiment of FIG. 5 may be relatively modeled and analyzed through the use of a pseudo rigid body model. Parameters for the design of the clutch 126 can then be obtained for a given application.

Figure 6:
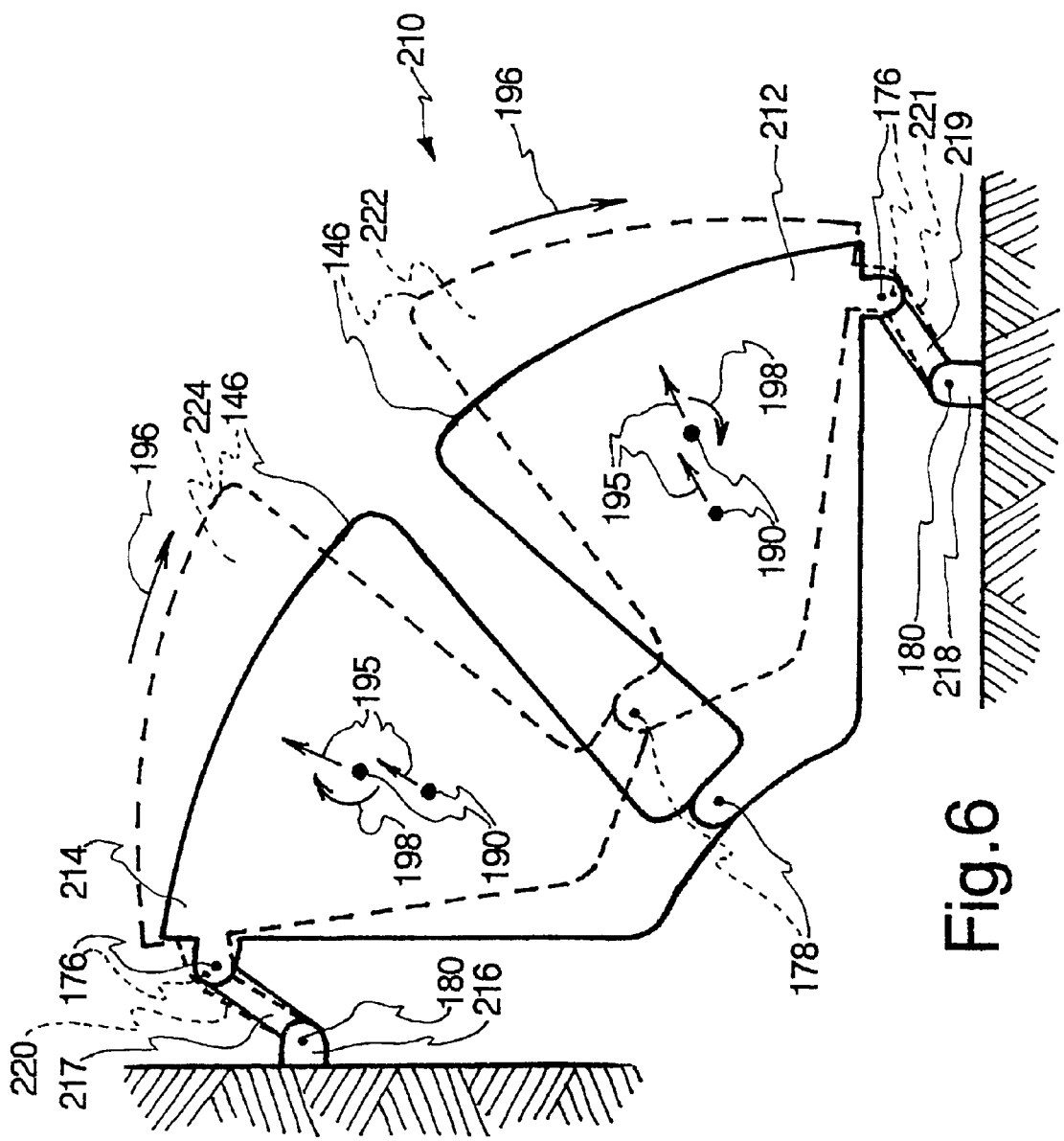
FIG. 6 is a pseudo-rigid body model depicting one symmetrical third of the clutch of FIG. 5, in retracted and extended configurations.

Referring to FIG. 6, a pseudo-rigid body model 210 of the clutch 126 is depicted. Rigid-body engagement members 212, 214 correspond to the engagement members 142, 144 of FIG. 5. In place of the sliders and surfaces 116, 117, 118, 119 of FIG. 4, the PRBM 210 of FIG. 6 has a first fixed attachment 216 pivotally attached to a first link 217 and a second fixed attachment 218 pivotally attached to a second link 219. The first link 217 is, in turn, pivotally connected to the aggressive rigid-body engagement member 212, and the second link 219 is pivotally attached to the non-aggressive rigid-body engagement member 214.

As with the PRBM 110 of FIG. 4, the PRBM 210 appears to contain five links: the fixed attachments 216, 218, the first link 217, the second link 219, and the two rigid-body engagement members 212, 214. The PRBM 210 would also appear to have two degrees of freedom, but once it is assumed that the links 217, 219 will rotate equally in opposite directions, only one degree of freedom exists. The rigid-body engagement members 212, 214 may thus assume the positions 222, 224 shown somewhat exaggerated in phantom when the centrifugal force 195 acts on the rigid-body engagement members. The links 117, 119 may move to extended positions 220, 221 to accommodate the outward motion of the rigid-body engagement members 212, 214.

As with the previous embodiment, the aggressive rigid-body engagement member 212 in the position 222, in contact with the interior surface 54, receives a frictional moment 198 tending to induce further rotation into engagement. Conversely, the non-aggressive rigid-body engagement member 214 in the position 224, in contact with the interior surface 54, receives a frictional moment 198 tending to induce rotation out of engagement.

Like the clutch 26, the symmetry of the clutch 126 permits the direction of rotation of the clutch 126 to be reversed without significantly affecting the operation of the clutch 126. Additionally, the aggressive engagement members 142 and the non-aggressive engagement members 144 are coupled to obtain some of the advantages of both aggressive and non-aggressive behavior.

The clutch 126 of FIG. 5 also consists of coplanar components, and may therefore be easily manufactured through the use of a single planar manufacturing operation. A wide variety of materials can also be used to form the clutch 126, but those with a high ratio of yield strength to elastic modulus are preferred.

Figure 7:
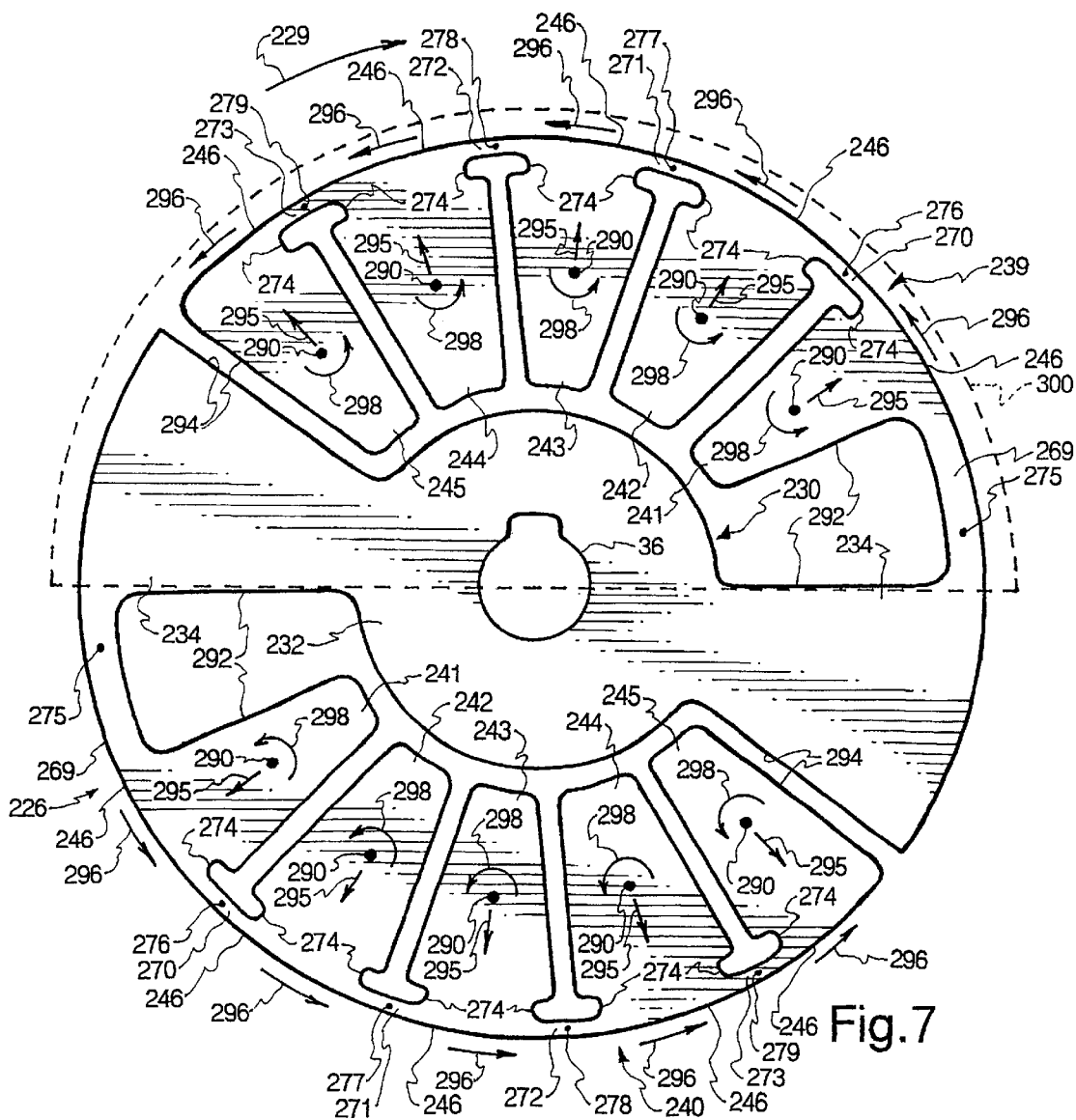
FIG. 7 is a plane view showing another alternative embodiment of a clutch according to the present invention.

Referring to FIG. 7, a plane view of yet another embodiment of the present invention is depicted. The clutch 226 of FIG. 7 is not designed for bi-directional use; rather, the clutch 226 is to be rotated with respect to the drum 28 in a direction of rotation 229 (clockwise, as depicted). As with previous embodiments, the clutch 226 may have a hub 230 that includes a central portion 232 and one or more arms 234 extending outward from the central portion 232. Preferably, two arms 234 are provided, as shown. First and second arms 239, 240 of the clutch 236 maybe attached to the arms 234 of the hub 230 such that the arms 239, 240 trail behind the arms 234 when the clutch 226 is rotated in the direction 229.

The first and second arms 239, 240 may each have a plurality of engagement members. More particularly, each of the arms 239, 240 of the clutch 226 may have a first engagement member 241, a second engagement member 242, a third engagement member 243, a fourth engagement member 244, and a fifth engagement member 245. Each of the engagement members 241, 242, 243, 244, 245 may have an outer edge 246 shaped to frictionally contact the interior surface 54. In each of the arms 239, 240 of the clutch 226, a first flexible segment 269 may connect the first engagement member 241 to an arm 234 of the hub 230. The first flexible segment 269 may be made somewhat long and thick, if desired.

Additionally, second, third, fourth, and fifth flexible members 270, 271, 272, 273 may unitarily connect the first and second engagement members 241, 242, the second and third engagement members 242, 243, the third and fourth engagement members 243, 244, and the fourth and fifth engagement members 244, 245, respectively. Thus, the first and second arms 239, 240 each have a segmented configuration, with engagement members 241, 242, 243, 244, 245 "chained" together by the flexible segments 269, 270, 271, 272, 273.

Alcoves 274 may be formed in the engagement members 241, 242, 243, 244, 245 adjacent to the flexible segments 270, 271, 272, 273. As with the embodiment of FIGS. 1 through 3, the alcoves 274 serve to add to the length, and therefore flexibility, of the flexible segments 270, 271, 272, 273, but may be altered, eliminated, or reversed if desired to provide the desired degree of flexibility.

The first, second, third, fourth, and fifth flexible segments 269, 270, 271, 272, 273 may have equivalent pivots 275, 276, 277, 278, 279, respectively, as depicted in FIG. 7. Since the second, third, fourth, and fifth flexible segments 270, 271, 272, 273 are comparatively short, the equivalent pivots 276, 277, 278, 279 may be centrally positioned. However, as shown in FIG. 7, the first flexible segment 269 of each of the arms 239, 240 is longer than the remaining flexible segments 270, 271, 272, 273, and may also be somewhat thicker. For the reasons described in connection with FIG. 5, the equivalent pivots 275 may thus be positioned comparatively near the arms 234 of the hub 230.

Each of the engagement members 241, 242, 243, 244, 245 may have a center of gravity 290. The engagement members 241, 242, 243, 244, 245 need not have equal masses, but may be sized differently, as depicted in FIG. 7. Each of the arms 239, 240 of the clutch 226 may have an interior opening 292 inside the first flexible segment 275 and an exterior opening 294 that permits separation of the fifth engagement members 245 from the arms 234 of the hub 230. Thus, the arms 239, 240 of the clutch 226 are not completely detached from the hub 230, like the expandable engagement portion 40 of FIGS. 1–3, and they are not redundantly connected to the hub 230, like the extensible engagement portions of FIG. 5. Rather, the arms 239, 240 are each attached at a single point, i.e., via the first flexible segments 275, to the hub 230.

When the clutch 226 rotates, centrifugal forces 295 act on the centers of gravity 290 of the engagement members 241, 242, 243, 244, 245. When the clutch 226 rotates rapidly enough to engage the drum 28, the drum 28 induces frictional forces 296 against the outer edges 246 of the engagement members 241, 242, 243, 244, 245. The frictional forces 296 induce frictional moments 298 tending to rotate each of the engagement members 241, 242, 243, 244, 245 in a counterclockwise direction, or away from the interior surface 54 of the drum 28. Consequently, all of the engagement members 241, 242, 243, 244, 245 are non-aggressive.

The unique, segmented design of each of the arms 239, 240 is beneficial for a number of reasons. First, through the use of a plurality of independently movable engagement members 241, 242, 243, 244, 245, the number of surfaces through which torque can be transmitted to the interior surface 54 can effectively be increased. Thus, the torque capacity of the clutch 226 may be enhanced compared to conventional S-shaped clutch designs without segmented arms. Additionally, the segmented shape permits the engagement members 241, 242, 243, 244, 245 to engage the interior surface 54 one-by-one to provide a more gradual engagement.

For example, the fifth engagement member 245 may engage the interior surface 54 at a threshold rate of rotation, at which the remaining engagement members 241, 242, 243, 244 remain disengaged from the interior surface 54. When the rate of rotation of the clutch 226 increases further, the fourth engagement member 244 may engage the interior surface 54, along with the fifth engagement member 245 to provide a higher level of friction, and therefore, a greater torque capacity. In similar fashion, the third, second, and then first engagement members 243, 242, 241 may engage the interior surface 54 in sequence, so that the buildup of torque transfer to the drum 28 is very gradual.

Although the clutch 226 could be formed and utilized with only a single arm around nearly the entire circumference of the clutch 226, a symmetrical, multiple arm configuration is preferred to ensure that the clutch 226 remains rotationally balanced. In the embodiment shown in FIG. 7, the clutch 226 has two symmetrical halves; the analysis of one symmetrical half 300 applies to the other half Despite the fact that the engagement members 241, 242, 243, 244, 245 are not connected with each other or with the hub 230 in any type of closed loop, the pseudo-rigid body model may still be applied to analyze the operation of the clutch 226. Through application of the model, the parameters of the clutch 226 can be altered to adapt the clutch 226 for a wide variety of applications.

Figure 8:
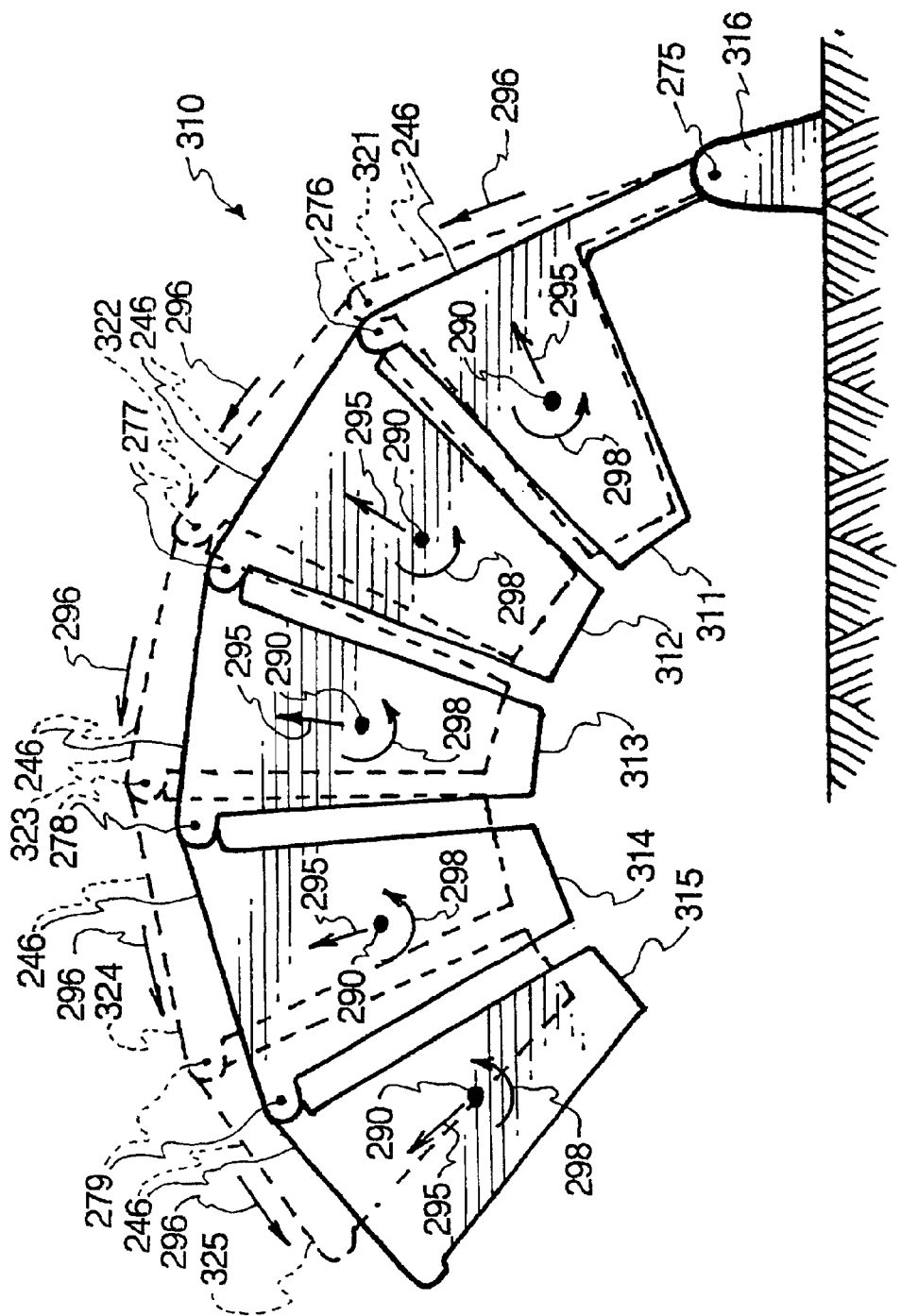
FIG. 8 is a pseudo-rigid body model depicting one symmetrical half of the clutch of FIG. 7, in retracted and extended configurations.

Referring to FIG. 8, a pseudo-rigid body model 310 of the symmetrical half 300 of the clutch 226 is depicted. As with FIGS. 4 and 6, engagement members with unitarily formed flexible segments may be modeled as rigid members connected by spring-loaded pin joints. More specifically, first, second, third, fourth, and fifth rigid-body engagement members 311, 312, 313, 314, 315 are depicted in FIG. 8. The first equivalent pivot 275 serves to pivotally connect the first rigid-body engagement member 311 to a fixed attachment 316. Thereafter, the second, third, fourth, and fifth equivalent pivots 276, 277, 278, 279 pivotally connect the first, second, third, fourth, and fifth rigid-body engagement members 311, 312, 313, 314, 315, respectively, in a chaining fashion.

During rotation of the clutch 226, the rigid-body engagement members 311, 312, 313, 314, 315 pivot outward to the positions 321, 322, 323, 324, 325 depicted in phantom. The centers of gravity 290 also move accordingly, but for purposes of clarity, the centers of gravity 290 have been shown in connection with the undeflected rigid-body engagement members 311, 312, 313, 314, 315 only. Nevertheless, as described in FIG. 7, the frictional moments 298 act in a counterclockwise direction, tending to draw the rigid-body engagement members 311, 312, 313, 314, 315 inward, away from the interior surface 54.

As with the previous embodiments, the clutch 226 is composed of planar elements, so that the clutch 226 can be manufactured in a single planar manufacturing operation. The clutch 226 may be made from a wide variety of materials, depending on the desired application for the clutch 226. Through the use of the PRBM 310, the parameters of the clutch 226, such as the weights of the engagement members 241, 242, 243, 244, 245, the lengths and widths of the flexible segments 269, 270, 271, 272, 273, the material of which the clutch 226 is made, and the like may all be selected for optimum performance.

Through the systems and methods of the invention, compact, lightweight clutches may provide a comparatively high torque capacity with a smooth engagement. According to certain aspects of the invention, such improvements are obtained by providing a plurality of engagement members to increase the number of surfaces through which the clutch can transmit friction, coupling aggressive and non-aggressive engagement members, providing for simultaneous or ordered engagement of the engagement members, detaching engagement members from the hub, and/or redundantly connecting engagement members to the hub. Those of skill in the art will recognize that other compliant clutch configurations, besides those specifically shown and described herein, may be designed and utilized according to the invention.

What is claimed is:

1. A clutch configured to selectively transmit torque between a first rotatable member and a second rotatable member, the second rotatable member being connected to a receiving member having an interior surface, the clutch comprising:
    a hub configured to be attached to the first rotatable member;
    at least three engagement members, each engagement member having an outer edge; and
    a plurality of flexible segments integrally formed with the engagement members, the flexible segments having a plurality of equivalent pivots about which the outer edges are pivotable into contact with the interior surface, the flexible segments being configured to exert a resilient force tending to retract the outer edges from the interior surface.

2. The clutch of claim 1, further comprising a total of at least six engagement members.

3. The clutch of claim 1, wherein the engagement members are configured to extend outward in relation to a rotational speed of the clutch.

4. The clutch of claim 3, wherein the resilient force is selected to permit contact of the outer edges with the interior surface when a rate of rotation of the clutch exceeds a selected threshold rate of rotation.

5. The clutch of claim 1, wherein the engagement members are oriented such that the clutch operates in the same manner in either rotational direction.

6. The clutch of claim 5, wherein half of the engagement members comprise aggressive engagement members connected to the hub to provide aggressive engagement with the interior surface, and wherein half of the engagement members comprise non-aggressive engagement members connected to the hub to provide non-aggressive engagement with the interior surface.

7. The clutch of claim 6, wherein each of the aggressive engagement members is coupled to a non-aggressive engagement member to form an engagement pair in which the outer edges are constrained to be substantially equidistant from the interior surface.

8. The clutch of claim 7, wherein each engagement pair is attached to the hub by two flexible connectors disposed at opposite ends of the engagement pair, the flexible connectors cooperating to urge the outer edges of the engagement pair away from the interior surface.

9. The clutch of claim 1, wherein the hub, engagement members, and flexible segments remain substantially coplanar during operation of the clutch.

10. The clutch of claim 1, wherein the hub is detached from the engagement members.

11. The clutch of claim 1, wherein the engagement members are attached end-to-end to form an arm extending from the hub, the engagement members being movable with respect to each other.

12. A clutch configured to selectively transmit torque between a first rotatable member and a second rotatable member, the second rotatable member being connected to a receiving member having an interior surface, the clutch comprising:
    a hub configured to be attached to the first rotatable member; and
    an expandable engagement portion encircling the hub, the expandable engagement portion being detached from the hub, wherein the expandable engagement portion is configured to selectively expand to contact the interior surface, the expandable engagement portion having at least one flexible segment configured to urge the expandable engagement portion from an expanded configuration to a contracted configuration;
    wherein the hub and the engagement portion are configured to permit transmission of torque between the hub and the expandable engagement portion
    wherein the engagement portion comprises at least one aggressive engagement member configured to aggressively contact the interior surface, and at least one non-aggressive engagement member configured to non-aggressively contact the interior surface.

13. The clutch of claim 12, wherein each engagement member comprises an outer edge configured to selectively contact the interior surface.

14. The clutch of claim 13, wherein the expandable engagement portion comprises an equal number of flexible segments and engagement members, and wherein each engagement member is connected to two adjacent engagement members by two of the flexible segments.

15. The clutch of claim 14, wherein half of the flexible segments are outwardly disposed with respect to the hub, and wherein half of the flexible segments are disposed comparatively nearer the hub, so that adjacent engagement members rotate in opposite directions about their own centers of gravity during expansion of the expandable engagement portion.

16. The clutch of claim 15, wherein the hub comprises a plurality of arms extending outward, and wherein the expandable engagement portion comprises a plurality of interior slots configured to cooperate with the arms to transfer torque between the hub and the expandable engagement portion.

17. The clutch of claim 12, wherein the hub fits within the expandable engagement portion so that the expandable engagement portion and the hub are substantially coplanar.

18. A clutch configured to selectively transmit torque between a first rotatable member and a second rotatable member, the second rotatable member being connected to a receiving member having an interior surface, the clutch comprising:
    a hub configured to be fixedly attached to the first rotatable member;
    an extensible engagement portion configured to selectively extend to contact the interior surface, the extensible engagement portion comprising two flexible segments integrally formed with the extensible engagement portion and the hub, the flexible segments being configured to cooperate to urge the extensible engagement portion from an extended configuration to a retracted configuration; and wherein each flexible segment connects the extensible engagement portion to the hub such that the hub and the extensible engagement portion form a closed loop.

19. The clutch of claim 18, wherein the extensible engagement portion further comprises a plurality of engagement members, each engagement member having an outer edge configured to selectively contact the interior surface.

20. The clutch of claim 19, wherein the hub comprises a plurality of arms extending outward, each arm having a flexible segment integrally formed with the arm and with an engagement member.

21. The clutch of claim 20, wherein the engagement members comprise aggressive engagement members configured to aggressively contact the interior surface, and non-aggressive engagement members configured to non-aggressively contact the interior surface.

22. The clutch of claim 21, wherein one aggressive engagement member and one non-aggressive engagement member are disposed between each adjacent pair of arms to form an engagement pair, the engagement members of each engagement pair being connected by a flexible segment so that each engagement member is redundantly connected to the hub.

23. A clutch configured to selectively transmit torque between a first rotatable member and a second rotatable member, the second rotatable member being connected to a receiving member having an interior surface, the clutch comprising:
   a hub configured to be attached to the first rotatable member;
   a first arm integrally formed with the hub, the first arm having a first engagement member and a second engagement member, each engagement member having an outer edge movable with respect to the hub to selectively contact the interior surface of the receiving member, the first arm further having a first flexible segment and a second flexible segment; and
   wherein the second flexible segment movably connects the first engagement member with the second engagement member.

24. The clutch of claim 23, wherein the hub comprises an arm, the first flexible segment being integrally formed with the arm of the hub and with the first flexible segment so that the first arm is movably connected to the arm of the hub.

25. The clutch of claim 24, wherein the first arm further comprises:
   a third engagement member connected to the second engagement member by a third flexible member;
   a fourth engagement member connected to the third engagement member by a fourth flexible member; and
   a fifth engagement member connected to the fourth engagement member by a fifth flexible member.

26. The clutch of claim 23, wherein the second flexible segment is disposed proximate the outer edges of the first and second engagement members.

27. The clutch of claim 23, further comprising a second arm integrally formed with the hub, the second arm having engagement members and flexible segments configured so that the second arm is symmetrical to the first arm.

28. The clutch of claim 27, further comprising a third arm integrally formed with the hub, the third arm having engagement members and flexible segments configured so that the third arm is symmetrical to the first and second arms.

29. A clutch configured to selectively transmit torque between a first rotatable member and a second rotatable member, the second rotatable member being connected to a receiving member having an interior surface, the clutch comprising:
   a hub configured to be attached to the first rotatable member;
   an aggressive engagement member having an outer edge movable with respect to the hub to selectively contact the interior surface of the receiving member;
   a non-aggressive engagement member having an outer edge movable with respect to the hub to selectively contact the interior surface of the receiving member; and
   a flexible segment connecting the aggressive engagement member to the non-aggressive engagement member, the flexible segment operating to maintain the outer edges a substantially equal distance from the interior surface.

30. The clutch of claim 29, wherein the aggressive and non-aggressive engagement members are connected to rotate in opposite directions about their own centers of gravity.

31. The clutch of claim 29, wherein the flexible segment is positioned toward the hub.

32. The clutch of claim 29, wherein the aggressive engagement member and the non-aggressive engagement member, together, form a first engagement pair, and wherein the clutch further comprises a plurality of additional engagement pairs symmetrically disposed about the hub with respect to the first engagement pair.

33. The clutch of claim 32, wherein each engagement pair is redundantly connected to the hub to form a closed kinematic loop.

34. The clutch of claim 32, wherein the engagement pairs are attached to each other by flexible segments, and wherein the engagement pairs are detached from the hub.

35. A method for manufacturing a clutch configured to selectively transmit torque between a first rotatable member and a second rotatable member, the second rotatable member being connected to a receiving member having an interior surface, the method comprising:
   providing a workpiece;
   forming at least three engagement members in the workpiece, each engagement member having an outer edge; and
   forming a plurality of flexible segments in the workpiece to connect the engagement members, the flexible segments having a plurality of equivalent pivots about which the outer edges are pivotable into contact with the interior surface.

36. The method of claim 35, wherein the workpiece is of a material selected to have a high ratio of yield strength to elastic modulus.

37. The method of claim 36, wherein the workpiece is of a steel, aluminum, or plastic material.

38. The method of claim 35, wherein forming the plurality of flexible segments comprises providing a length and thickness for each flexible segment, the length and thickness being selected to provide a resilient force tending to keep the outer edges from contacting the interior surface until a threshold outward force acts on the engagement members.

39. The method of claim 35, further comprising forming a hub centrally positioned with respect to the engagement members, the engagement members being arrayed symmetrically about the hub.

40. The method of claim 39, wherein forming the engagement members comprises orienting the engagement members so that operation of the clutch is substantially the same in either rotational direction.

41. The method of claim 40, wherein forming the engagement members comprises:

forming aggressive engagement members configured to contact the interior surface in aggressive fashion; and forming non-aggressive engagement members configured to contact the interior surface in non-aggressive fashion.

42. The method of claim 41, wherein each aggressive engagement member is connected to a non-aggressive engagement member by a flexible segment to form an engagement pair, the engagement members of each engagement pair being configured to move jointly such that the outer edges of the engagement pair are equidistant from the interior surface.

43. The method of claim 39, wherein the hub, engagement members, and flexible segments are formed in-plane with each other.

44. The method of claim 43, wherein forming the hub, engagement members, and flexible segments further comprises utilizing a single manufacturing operation to form the hub, engagement members, and flexible segments.

45. The method of claim 44, wherein the hub is unitary with the engagement members and the flexible segments.

46. The method of claim 44, wherein the hub is detached from, but rotationally coupled to, the engagement members and the flexible segments.

47. A method for transmitting torque between a first rotatable member and a second rotatable member, the method comprising:

providing a receiving member, the receiving member having an interior surface;

attaching the receiving member to the second rotatable member;

providing a clutch having a hub, a plurality of engagement members with outer edges configured to move with respect to the hub to selectively contact the interior surface, and a plurality of flexible segments integrally formed with the engagement members to exert a force tending to withdraw the outer edges from the interior surface;

attaching the clutch to the first rotatable member; and disposing the clutch within the receiving member such that the outer edges are aligned with the interior surface such that at least one of the engagement members is disposed to aggressively contact the interior surface, and at least one of the engagement members is disposed to non-aggressively contact the interior surface.

48. The method of claim 47, further comprising exerting an outward force on the receiving members to induce the outer edges to contact the interior surface.

49. The method of claim 48, wherein the outward force is induced exclusively by rotation of the clutch.

50. The method of claim 49, further comprising rotating the clutch at a rate of rotation above a threshold rate of rotation, the threshold rate of rotation being the rate of rotation at which the outward force is large enough to induce contact of the outer edges with the interior surface.

51. The method of claim 47, wherein the engagement members comprise a first engagement member and a second engagement member connected so that the outer edge of the second engagement member contacts the interior surface at a comparatively lower rate of rotation, and the outer edge of the first engagement member contacts the interior surface at a comparatively higher rate of rotation.

52. A method for designing a compliant clutch having desired operational characteristics, the method comprising:

creating a proposed shape for the clutch, the proposed shape having a hub, a plurality of engagement members, and plurality of flexible segments connecting the engagement members to the hub;

creating a pseudo-rigid body model of the proposed shape, the pseudo-rigid body model having spring-actuated pin joints in place of the flexible segments;

performing kinematic analysis of the proposed shape using the pseudo-rigid body model; and modifying the proposed shape to obtain a selected shape for a compliant clutch having the desired operational characteristics.

53. The method of claim 52, wherein modifying the proposed shape comprises modifying a length of the flexible segments.

54. The method of claim 52, wherein modifying the proposed shape comprises modifying a thickness of the flexible segments.

55. The method of claim 52, wherein modifying the proposed shape comprises modifying a mass of each engagement member.

56. The method of claim 52, wherein modifying the proposed shape comprises modifying a geometry of outer edges of the engagement members.

57. The method of claim 52, wherein modifying the proposed shape comprises reshaping each engagement member to move a center of gravity of each engagement member.

58. The method of claim 52, wherein modifying the proposed shape comprises changing a total number of engagement members.

59. The method of claim 52, further comprising selecting a material for the clutch having a density, stiffness, and yield strength selected to provide the desired operational characteristics.

* * * * *

UNITED STATES PATENT AND TRADEMARK OFFICE
CERTIFICATE OF CORRECTION

PATENT NO. : 6,736,249 B2
DATED : May 18, 2004
INVENTOR(S) : Larry Howell et al.

It is certified that error appears in the above-identified patent and that said Letters Patent is hereby corrected as shown below:

Column 11,
Line 45, please delete "6f" and replace with -- of --.

Column 13,
Lines 53 and 59, please delete "maybe" and replace with -- may be --.

Column 14,
Line 58, please delete "maybe" and replace with -- may be --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,736,249 B2  Page 1 of 1
APPLICATION NO. : 10/203491
DATED : May 18, 2004
INVENTOR(S) : Larry Howell et al.

It is certified that error appears in the above-identified patent and that said Letters Patent is hereby corrected as shown below:

At col. 1, line 6, please insert:

--The invention was made with Government support under a graduate research fellowship and NSF Career Award No. DMI-9624574 awarded by the National Science Foundation. The Government has certain rights in the invention.--

Signed and Sealed this

Thirtieth Day of December, 2008

JON W. DUDAS
*Director of the United States Patent and Trademark Office*